United States Patent
Nishida et al.

(10) Patent No.: US 9,040,218 B2
(45) Date of Patent: May 26, 2015

(54) SOLUTION OF GALLIUM PHTHALOCYANINE METHOD FOR PREPARING THE SAME METHOD FOR PRODUCING GALLIUM PHTHALOCYANINE CRYSTAL METHOD FOR PURIFYING COMPOSITION CONTAINING GALLIUM PHTHALOCYANINE AND METHOD FOR PRODUCING ELECTROPHOTOGRAPHIC PHOTOSENSITIVE MEMBER

(71) Applicant: CANON KABUSHIKI KAISHA, Tokyo (JP)

(72) Inventors: Tsutomu Nishida, Mishima (JP); Masato Tanaka, Tagata-gun (JP); Masataka Kawahara, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/167,906

(22) Filed: Jan. 29, 2014

(65) Prior Publication Data

US 2014/0212804 A1 Jul. 31, 2014

(30) Foreign Application Priority Data

Jan. 31, 2013 (JP) .................................. 2013-017120
Jul. 31, 2013 (JP) .................................. 2013-159301

(51) Int. Cl.
*G03G 5/04* (2006.01)
*G03C 1/735* (2006.01)
*G03G 5/06* (2006.01)

(52) U.S. Cl.
CPC .............. *G03C 1/735* (2013.01); *G03G 5/0696* (2013.01)

(58) Field of Classification Search
CPC ........ G03G 5/10; G03G 5/0525; G03G 5/102
USPC ........................................................ 430/127
See application file for complete search history.

(56) References Cited

U.S. PATENT DOCUMENTS

2005/0064309 A1* 3/2005 Itami ................................ 430/60
2006/0154159 A1* 7/2006 Lim et al. ..................... 430/59.4

(Continued)

FOREIGN PATENT DOCUMENTS

JP 6-279698 A 10/1994
JP 2010-202747 A 9/2010

*Primary Examiner* — Hoa V Le
(74) *Attorney, Agent, or Firm* — Canon USA Inc. IP Division

(57) ABSTRACT

A solution of a gallium phthalocyanine contains a compound of formula (1) and a gallium phthalocyanine of formula (2), $$H_2N-CH_2-R^1-CH_2-NH_2 \quad (1)$$

wherein $R^1$ represents a single bond, or a substituted or unsubstituted alkylene group having 1 to 10 main-chain carbon atoms, a substituent of the substituted alkylene group is an alkyl group having 1 to 3 carbon atoms, an alkyl group having 1 to 3 carbon atoms and being substituted with an amino group, or a hydroxy group, one of the carbon atoms in the main chain of the alkylene group may be replaced with an oxygen atom, a sulfur atom, or a bivalent group represented by the formula $-NR^2-$, and $R^2$ represents a hydrogen atom, an alkyl group having 1 to 3 carbon atoms, or an alkyl group having 1 to 3 carbon atoms and being substituted with an amino group, and

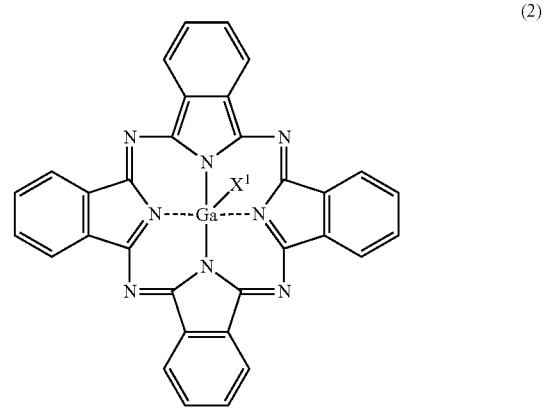

(2)

wherein $X^1$ represents a chlorine atom or hydroxy group.

4 Claims, 1 Drawing Sheet

(56) References Cited

U.S. PATENT DOCUMENTS

2007/0003853 A1* 1/2007 Inagaki et al. ............... 430/66
2008/0268357 A1* 10/2008 Wada et al. .................. 430/66
2013/0209928 A1* 8/2013 Fujii ............................ 430/56

* cited by examiner

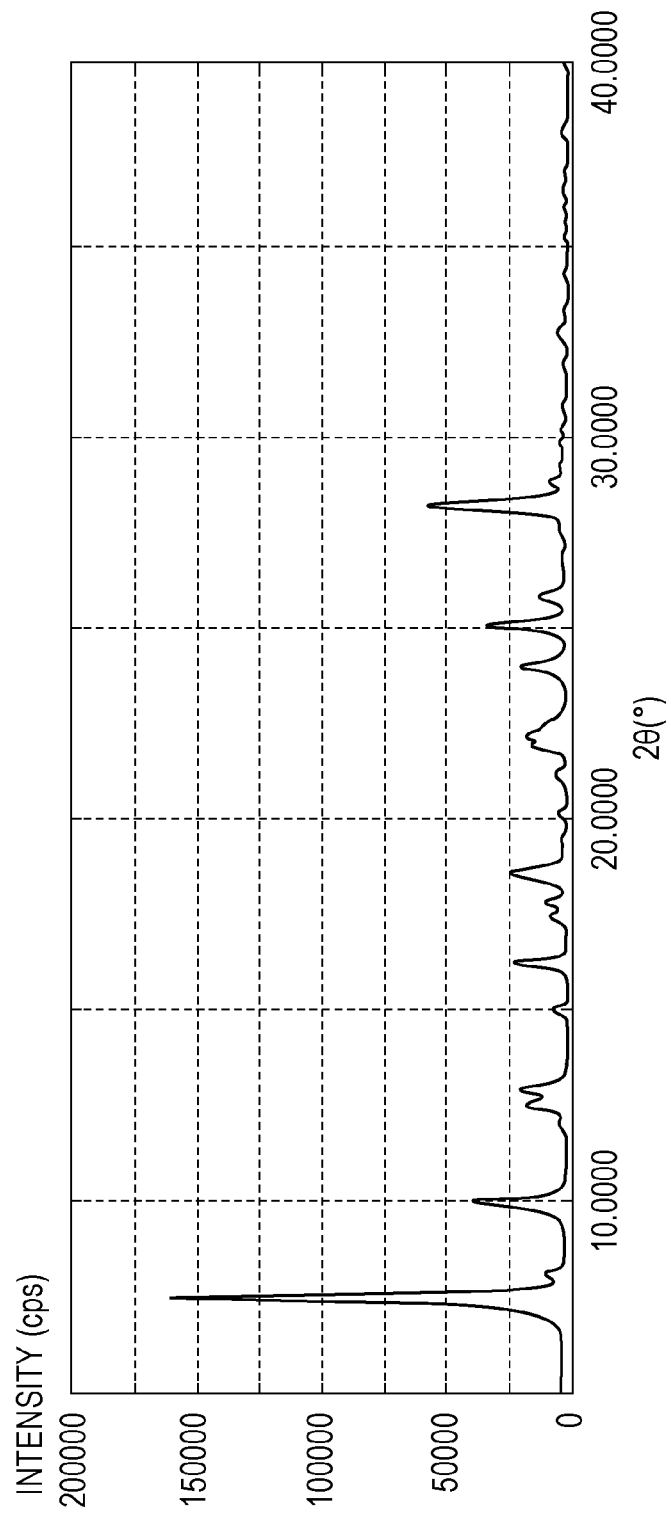

SOLUTION OF GALLIUM PHTHALOCYANINE METHOD FOR PREPARING THE SAME METHOD FOR PRODUCING GALLIUM PHTHALOCYANINE CRYSTAL METHOD FOR PURIFYING COMPOSITION CONTAINING GALLIUM PHTHALOCYANINE AND METHOD FOR PRODUCING ELECTROPHOTOGRAPHIC PHOTOSENSITIVE MEMBER

BACKGROUND OF THE INVENTION

1. Field of the Invention

Embodiments of the present invention relate to a solution of a gallium phthalocyanine, a method for preparing the same, a method for producing a gallium phthalocyanine crystal, a method for purifying a composition containing a gallium phthalocyanine, and a method for producing an electrophotographic photosensitive member.

2. Description of the Related Art

A gallium phthalocyanine represented by the formula (2) (hereinafter, also referred to simply as a "gallium phthalocyanine") has excellent stability and photosensitivity and thus has been widely used as, in particular, a charge generation material for use in an electrophotographic photosensitive member,

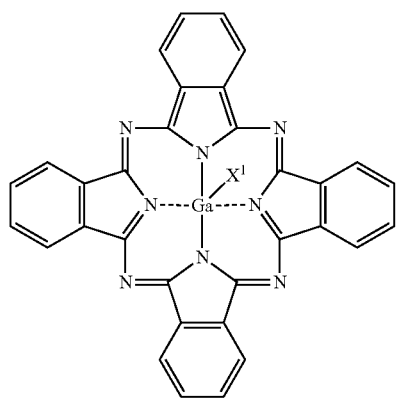

(2)

wherein, in the formula (2), $X^1$ represents a chlorine atom or a hydroxy group. $X^1$ is also referred to as a ligand (axial ligand) of the gallium atom of the gallium phthalocyanine.

Japanese Patent Laid-Open No. 6-279698 discloses an acid pasting process in which a gallium phthalocyanine is dissolved in a concentrated sulfuric acid and then treated for the purpose of using the gallium phthalocyanine as a charge generation material for an electrophotographic photosensitive member.

However, concentrated sulfuric acid is a strong acid. Thus, in the case where the gallium phthalocyanine is used as a charge generation material for an electrophotographic photosensitive member, a neutralization step is required. A solution of a gallium phthalocyanine (or a composition containing a gallium phthalocyanine) in the related art is difficult to purify because of its high viscosity and thus severely restricts preparation conditions and storage conditions.

Japanese Patent Laid-Open No. 2010-202747 states N-methylpyrrolidone, dimethyl sulfoxide, dimethylacetamide, dimethyl sulfonamide, and N,N-dimethylformamide as good solvents for a gallium phthalocyanine.

However, there is room for improvement in the solubility of gallium phthalocyanine in N-methylpyrrolidone, dimethyl sulfoxide, dimethylacetamide, dimethyl sulfonamide, or N,N-dimethylformamide.

SUMMARY OF THE INVENTION

The present invention provides a novel solution of a gallium phthalocyanine, a method for preparing the solution of the gallium phthalocyanine, a method for producing a gallium phthalocyanine crystal, a method for purifying a composition containing a gallium phthalocyanine, and a method for producing an electrophotographic photosensitive member.

According to an aspect of the present invention, a solution of a gallium phthalocyanine contains a compound represented by the following formula (1) and a gallium phthalocyanine represented by the following formula (2),

(1)

wherein, in the formula (1), $R^1$ represents a single bond, or a substituted or unsubstituted alkylene group having 1 to 10 main-chain carbon atoms, a substituent of the substituted alkylene group is an alkyl group having 1 to 3 carbon atoms, an alkyl group having 1 to 3 carbon atoms and being substituted with an amino group, or a hydroxy group, one of the carbon atoms in the main chain of the alkylene group may be replaced with an oxygen atom, a sulfur atom, or a bivalent group represented by the formula $-NR^2-$, and $R^2$ represents a hydrogen atom, an alkyl group having 1 to 3 carbon atoms, or an alkyl group having 1 to 3 carbon atoms and being substituted with an amino group, and

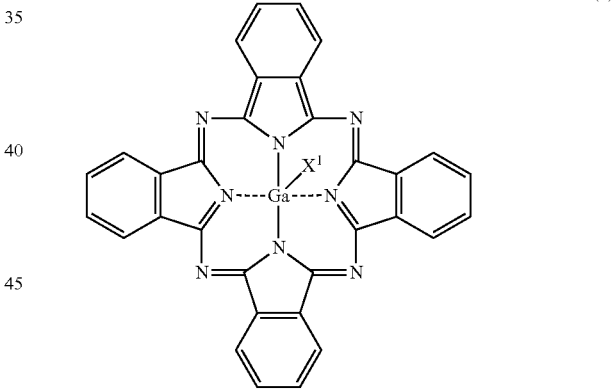

(2)

wherein, in the formula (2), $X^1$ represents a chlorine atom or a hydroxy group.

According to another aspect of the present invention, a method for preparing a solution of a gallium phthalocyanine includes:

dissolving a gallium phthalocyanine represented by the formula (2) in a compound represented by the formula (1).

According to another aspect of the present invention, a method for producing a gallium phthalocyanine crystal includes:

(a1) preparing a solution of a gallium phthalocyanine by the foregoing method; and (b1) mixing the solution prepared in the step (a1) with a poor solvent for the gallium phthalocyanine to perform the crystal transformation of the gallium phthalocyanine, thereby forming a hydroxygallium phthalocyanine crystal having peaks at Bragg angles 2θ of 6.9°±0.3° and 26.6°±0.3° in X-ray diffraction with CuKα radiation or a hydroxygallium phthalocyanine crystal having peaks at Bragg angles 2θ of 7.4°±0.3° and 28.3°±0.3° in X-ray diffraction with CuKα radiation.

According to another aspect of the present invention, a method for purifying a composition containing a gallium phthalocyanine includes:

(a2) mixing a compound represented by the formula (1) with a composition containing a gallium phthalocyanine represented by the formula (2) to prepare a solution; and (b2) filtering the solution prepared in the step (a2) to purify the composition containing the gallium phthalocyanine represented by the formula (2).

Another aspect of the present invention provides a method for producing an electrophotographic photosensitive member by the use of the foregoing solution of the gallium phthalocyanine.

According to another aspect of the present invention, a method for producing an electrophotographic photosensitive member includes preparing a solution of a gallium phthalocyanine by the foregoing method and producing an electrophotographic photosensitive member by the use of the prepared solution of the gallium phthalocyanine.

According to another aspect of the present invention, a method for producing an electrophotographic photosensitive member includes producing a hydroxygallium phthalocyanine crystal by the foregoing method and producing an electrophotographic photosensitive member by the use of the produced hydroxygallium phthalocyanine crystal.

According to another aspect of the present invention, a method for producing an electrophotographic photosensitive member includes purifying a composition containing a gallium phthalocyanine by the foregoing purification method and producing an electrophotographic photosensitive member by the use of the purified composition containing the gallium phthalocyanine.

Further features of the present invention will become apparent from the following description of exemplary embodiments with reference to the attached drawing.

BRIEF DESCRIPTION OF THE DRAWING

FIGURE is an X-ray diffraction pattern of a hydroxygallium phthalocyanine crystal prepared in Example 22.

DESCRIPTION OF THE EMBODIMENTS

A solution of a gallium phthalocyanine according to an embodiment of the present invention contains a compound (diamine compound) represented by the following formula (1) and a gallium phthalocyanine represented by the following formula (2), $$H_2N-CH_2-R^1-CH_2-NH_2 \quad (1)$$

wherein, in the formula (1), $R^1$ represents a single bond, or a substituted or unsubstituted alkylene group having 1 to 10 main-chain carbon atoms, a substituent of the substituted alkylene group is an alkyl group having 1 to 3 carbon atoms, an alkyl group having 1 to 3 carbon atoms and being substituted with an amino group, or a hydroxy group, one of the carbon atoms in the main chain of the alkylene group may be replaced with an oxygen atom, a sulfur atom, or a bivalent group represented by the formula $-NR^2-$, and $R^2$ represents a hydrogen atom, an alkyl group having 1 to 3 carbon atoms, or an alkyl group having 1 to 3 carbon atoms and being substituted with an amino group, and

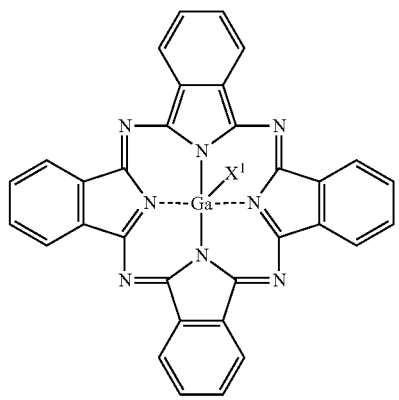

(2)

wherein, in the formula (2), $X^1$ represents a chlorine atom or a hydroxy group.

A method for preparing a solution of a gallium phthalocyanine according to an embodiment of the present invention includes dissolving the gallium phthalocyanine represented by the formula (2) in the compound represented by the formula (1).

The compound represented by the formula (1) is a solvent which dissolves the gallium phthalocyanine serving as a solute represented by the formula (2) and in which the gallium phthalocyanine represented by the formula (2) has a high solubility. In other words, the compound serves as a good solvent for the gallium phthalocyanine represented by the formula (2).

Examples of the compound represented by the formula (1) include 1,2-diaminoethane (ethylenediamine), 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, 2-methyl-1,5-diaminopentane, diethylenetriamine, tris(2-aminoethyl)amine, 2,2'-thiobis(ethylamine), 1,2-diaminopropane, 1,2-diamino-2-2-methylpropane, 2-methyl-1,3-propanediamine, 1,3-diamino-2-propanol, 2,2-dimethyl-1,3-propanediamine, diethylenetriamine, 2,2'-oxybis(ethylamine), 2-methyl-1,5-diaminopentane, 2,2'-diamino-N-methyldiethylamine, 3,3'-diaminodipropylamine, bis(3-aminopropyl) ether, 3,3'-diamino-N-methyldipropylamine, N,N'-bis(3-aminopropyl)ethylenediamine, ethylene glycol bis(3-aminopropyl) ether, tris(3-aminopropyl)amine, 1,4-butanediol bis(3-aminopropyl) ether, bis(hexamethylene)triamine, triethylenetetramine, 1,2-bis(2-aminoethoxy)ethane, N,N'-bis(2-aminoethyl)-1,3-propanediamine, 1,11-diamino-3,6,9-trioxaundecane, 2-(aminomethyl)-2-methyl-1,3-propanediamine, and tetraethylenepentamine. These compounds (solvents) may be used separately or in combination of two or more.

In an embodiment of the present invention, the compound represented by the formula (1) may be used in combination with a compound other than the compound represented by the formula (1).

Among gallium phthalocyanines represented by the formula (2), when $X^1$ in the formula (2) represents a chlorine atom, the gallium phthalocyanine is referred to as chlorogallium phthalocyanine. Among the gallium phthalocyanines represented by the formula (2), when $X^1$ in the formula (2) represents a hydroxy group, the gallium phthalocyanine is referred to as hydroxygallium phthalocyanine. Chlorogallium phthalocyanine and hydroxygallium phthalocyanine may be used alone or in combination.

The inventors have conducted studies to improve the solubility of the gallium phthalocyanine and have found that a compound which is represented by the formula (1) and has amino groups (unsubstituted amino groups) at both ends of the main chain dissolves a large amount of the gallium phthalocyanine, compared with solvents used in the past. The inventors speculate that the reason for this is that the amino groups at both ends of the compound represented by the formula (1) form chelate bonds with the gallium atom of the gallium phthalocyanine represented by the formula (1). It is thus believed that if the main chain does not contain a structure that restricts the degree of structural freedom of the amino groups, the high solubility effect is provided despite the atom or atomic group included in the main chain. The gallium phthalocyanine may contain an unsubstituted phthalocyanine ring as represented by the formula (2). In particular, in the case where the phthalocyanine ring of the gallium phthalocyanine is substituted (bonded) with a fluorine atom having high electronegativity, the amino groups, which are electron-donating groups, are liable to be attracted. Thus, the amino groups located at both ends of the compound represented by the formula (1) do not easily form chelate bonds with the gallium atom of the gallium phthalocyanine, so that the gallium phthalocyanine is not easily dissolved in the compound represented by the formula (1).

When the solution of a gallium phthalocyanine is prepared, a stirrer, for example, a magnetic stirrer, a mechanical stirrer, or a homogenizer, may be used. To promote the dissolution of the gallium phthalocyanine, heating may be performed.

The solution of a gallium phthalocyanine according to an embodiment of the present invention may be used for the production of gallium phthalocyanine crystals having various crystal forms, the conversion of crystal forms of gallium phthalocyanine crystals, and so forth. Embodiments of the present invention may also be used for the purification of a composition containing a gallium phthalocyanine, the analysis of a gallium phthalocyanine and a composition containing a gallium phthalocyanine, and so forth. The purification of the composition containing a gallium phthalocyanine used in an embodiment of the present invention refers to an increase in the gallium phthalocyanine content of the composition.

According to an embodiment of the present invention, even in the case of 6 parts by mass or more of the gallium phthalocyanine (solute) represented by the formula (2) with respect to 100 parts by mass of the compound (solvent) represented by the formula (1), the solvent is capable of successfully dissolving the gallium phthalocyanine represented by the formula (2). From the viewpoint of achieving a homogeneous solution of the gallium phthalocyanine represented by the formula (2), the gallium phthalocyanine (solute) represented by the formula (2) may be dissolved in an amount of 18 parts by mass or less with respect to 100 parts by mass of the compound (solvent) represented by the formula (1). Thus, the solution of a gallium phthalocyanine according to an embodiment of the present invention may contain the gallium phthalocyanine represented by the formula (2) in an amount of 18 parts by mass or less with respect to 100 parts by mass of the compound represented by the formula (1).

The compound which is represented by the formula (1) and has a lower molecular weight may be used because the number of moles of the compound in a certain mass is larger and thus the compound is capable of dissolving a larger amount of the gallium phthalocyanine represented by the formula (2). In addition, from the viewpoint of achieving good handleability of the solution of a gallium phthalocyanine, the compound which is represented by the formula (1) and which has a lower molecular weight may be used because the solution of a gallium phthalocyanine is more likely to have a lower viscosity. Specifically, the group interposed between the two amino groups located both ends in the formula (1) may be a group having 5 or less main-chain carbon atoms.

To dissolve a larger amount of the gallium phthalocyanine represented by the formula (2), a group having 3 or more main-chain carbon atoms may lie between the two amino groups located at both ends in the formula (1). The interposition of the group having 3 or more main-chain carbon atoms between the two amino groups located at both ends in the formula (1) results in the formation of better chelate bonds with the gallium atom of the gallium phthalocyanine represented by the formula (2).

Among compounds represented by the formula (1), therefore, a compound represented by the formula (1a) may be used,

$$H_2N-CH_2-R^3-CH_2-NH_2 \qquad (1a)$$

wherein, in the formula (1a), $R^3$ represents a substituted or unsubstituted alkylene group having 1 to 3 main-chain carbon atoms, a substituent of the substituted alkylene group is an alkyl group having 1 or 2 carbon atoms or an alkyl group having 1 or 2 carbon atoms and being substituted with an amino group, one of the carbon atoms in the main chain of the alkylene group may be replaced with an oxygen atom, a sulfur atom, or a bivalent group represented by the formula $-NR^4-$, and $R^4$ represents an alkyl group having 1 or 2 carbon atoms, or an alkyl group having 1 or 2 carbon atoms and being substituted with an amino group.

As the gallium phthalocyanine represented by the formula (2), a gallium phthalocyanine (hydroxygallium phthalocyanine) crystal having peaks at Bragg angles 2θ of 6.9°±0.3° and 26.6°±0.3° in X-ray diffraction with CuKα radiation may be used, in which $X^1$ in the formula (2) represents a hydroxy group. The gallium phthalocyanine (hydroxygallium phthalocyanine) has low crystallinity and can be successfully dissolved in the compound represented by the formula (1).

An embodiment of the present invention may be used for the production of a gallium phthalocyanine crystal.

A method for producing a gallium phthalocyanine crystal according to an embodiment of the present invention includes:

(a1) preparing a solution of a gallium phthalocyanine by the foregoing preparation method; and (b1) mixing the solution prepared in the step (a1) with a poor solvent for the gallium phthalocyanine represented by the formula (2) to perform the crystal transformation of the gallium phthalocyanine represented by the formula (2), thereby forming a hydroxygallium phthalocyanine crystal having peaks at Bragg angles 2θ of 6.9°±0.3° and 26.6°±0.3° in X-ray diffraction with CuKα radiation or a hydroxygallium phthalocyanine crystal having peaks at Bragg angles 2θ of 7.4°±0.3° and 28.3°±0.3° in X-ray diffraction with CuKα radiation.

In particular, in the case where the poor solvent used in the step (b1) is an aprotic solvent having a solubility parameter (SP) value of 9 or more and 14 or less, a hydroxygallium phthalocyanine crystal having peaks at Bragg angles 2θ of 7.4°±0.3° and 28.3°±0.3° in X-ray diffraction with CuKα radiation tends to be formed in the step (b1).

Examples of the aprotic solvent having an SP value of 9 or more and 14 or less include N,N-dimethylformamide, tetrahydrofuran, acetone, 1,3-dioxolan, pyridine, N-methyl-2- pyrrolidone, acetonitrile, dimethyl sulfoxide, and γ-butyrolactone. These solvents may be used separately or in combination of two or more.

In the case where the poor solvent used in the step (b1) is an aprotic solvent having an SP value of less than 9 or more than 14, a hydroxygallium phthalocyanine crystal having peaks at Bragg angles 2θ of 6.9°±0.3° and 26.6°±0.3° in X-ray diffraction with CuKα radiation tends to be formed.

Examples of the aprotic solvent having an SP value of less than 9 or more than 14 include water, toluene, triethylamine, and propylene carbonate. These solvents may be used separately or in combination of two or more.

Hitherto, the replacement of a ligand of the gallium atom of a chlorogallium phthalocyanine (the replacement of a chlorine atom represented by $X^1$ in the formula (2) with a hydroxy group) to form a hydroxygallium phthalocyanine has been performed by an acid pasting process. According to an embodiment of the present invention, it is possible to form the hydroxygallium phthalocyanine by dissolving a gallium phthalocyanine in the compound represented by the formula (1). The acid pasting process of the related art requires a neutralization step to convert the ligand of the gallium atom of the gallium phthalocyanine into a hydroxy group. In contrast, in the case of employing the method in which the gallium phthalocyanine is dissolved in the compound represented by the formula (1), the neutralization step may be omitted.

Hitherto, in the acid pasting process, water has often been used as a solvent used to precipitate a gallium phthalocyanine crystal for the purpose of inhibiting a reaction with sulfuric acid. The resulting gallium phthalocyanine crystal has peaks at Bragg angles 2θ of 6.9°±0.3° and 26.6°±0.3° in X-ray diffraction with CuKα radiation.

In contrast, the solution of a gallium phthalocyanine according to an embodiment of the present invention has a few restrictions on the solvent used to precipitate a gallium phthalocyanine crystal (poor solvent for a gallium phthalocyanine), compared with the acid pasting process. Thus, a hydroxygallium phthalocyanine crystal having peaks at Bragg angles 2θ of 7.4°±0.3° and 28.3°±0.3° in X-ray diffraction with CuKα radiation and a hydroxygallium phthalocyanine crystal having peaks at Bragg angles 2θ of 6.9°±0.3° and 26.6°±0.3° in X-ray diffraction with CuKα radiation are easily and selectively produced by selecting the SP value of a solvent used (a poor solvent used for a gallium phthalocyanine) as described above.

A hydroxygallium phthalocyanine crystal which is produced by the method according to an embodiment of the present invention and which has peaks at Bragg angles 2θ of 7.4°±0.3° and 28.3°±0.3° in X-ray diffraction with CuKα radiation exhibits excellent crystallinity, compared with a hydroxygallium phthalocyanine crystal of the same crystal form produced by a method in the related art (milling treatment).

An embodiment of the present invention may also be used for the purification of a composition containing a gallium phthalocyanine. That is, a method for purifying a composition containing a gallium phthalocyanine according to an embodiment of the present invention includes:

(a2) mixing a compound represented by the formula (1) with a composition containing a gallium phthalocyanine represented by the formula (2) to prepare a solution, and (b2) filtering the solution prepared in the step (a2) to purify the composition containing the gallium phthalocyanine represented by the formula (2).

The solution prepared in the step (a2) has a low viscosity and excellent filterability. Furthermore, the solution does not have high oxidizing power and is low risk of decomposing filter paper, thus improving the freedom of choice of filter paper in response to the filterability. Moreover, the solution prepared in the step (a2) does not have high oxidizing power, thus improving the freedom of choice of process design and a storage container, enhancing safety at work, and reducing environmental loading when the wastes are discarded.

Examples of a filtration method include natural filtration, filtration under reduced pressure, pressure filtration, and centrifugal filtration. Specific examples thereof include filtration with cellulose filters, filtration with glass-fiber filters, filtration with membrane filters, filtration with filter plates, cotton-plug filtration, cerite filtration, and sand filtration.

The method for purifying a composition containing a gallium phthalocyanine according to an embodiment of the present invention may further include subjecting the solution prepared in the step (a2) to adsorption treatment between the steps (a2) and (b2). The concentration of the gallium phthalocyanine in the composition (the purity of the gallium phthalocyanine) is increased by the adsorption treatment.

Examples of an active component of an adsorbent used for the adsorption treatment include silica gel, acidic alumina, neutral alumina, basic alumina, activated clay, zeolite, silicate salts, silicon oxides, metal oxides, and activated carbon.

Examples of a method of adsorption treatment include a method in which an adsorbent is added to a solution and the resulting mixture is mixed under stirring and is then passed through a filter to separate the adsorbent (a contact filtration method); and a method in which a solution is passed through a container filled with an adsorbent (a fixed-bed method). The adsorption treatment is described in detail in, for example, "Handbook of adsorption techniques (Kyuchaku Gijutu Hando Bukku); edited by Hiroshi Shimizu; NTS Inc., 1993".

EXAMPLES

While the present invention will be described in more detail below by specific examples, the present invention is not limited to these examples. In these examples, the term "part(s)" indicates "part(s) by mass".

Example 1

Three parts of gallium phthalocyanine (hydroxygallium phthalocyanine) crystals having peaks at Bragg angles 2θ of 6.9° and 26.6° in X-ray diffraction with CuKα radiation were mixed with 50 parts of 1,3-diaminopropane serving as a compound represented by the formula (1), the gallium phthalocyanine crystals being represented by the formula (2) in which $X^1$ in the formula (2) represents a hydroxy group. The mixture was stirred with a magnetic stirrer for 1 hour at a mixture temperature of 23° C. to prepare a solution of the gallium phthalocyanine (hydroxygallium phthalocyanine). The resulting solution of the gallium phthalocyanine was filtered under reduced pressure with circular quantitative filter paper No. 5C (manufactured by Advantec Toyo Kaisha, Ltd). After the filtration, it was confirmed that the insoluble residue of the gallium phthalocyanine (hydroxygallium phthalocyanine) was not present on the filter paper.

Example 2

A solution of a gallium phthalocyanine (hydroxygallium phthalocyanine) was prepared as in Example 1, except that 50 parts of 1,5-diaminopentane was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 3

A solution of a gallium phthalocyanine (hydroxygallium phthalocyanine) was prepared as in Example 1, except that 50 parts of 2-methyl-1,5-diaminopentane was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 4

A solution of a gallium phthalocyanine (hydroxygallium phthalocyanine) was prepared as in Example 1, except that 50 parts of diethylenetriamine was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 5

A solution of a gallium phthalocyanine (hydroxygallium phthalocyanine) was prepared as in Example 1, except that 50 parts of tris(2-aminoethyl)amine was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 6

A solution of a gallium phthalocyanine (hydroxygallium phthalocyanine) was prepared as in Example 1, except that 50 parts of 2,2'-thiobis(ethylamine) was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 7

A solution of a gallium phthalocyanine (chlorogallium phthalocyanine) was prepared as in Example 1, except that chlorogallium phthalocyanine crystals having peaks at Bragg angles 2θ of 7.4°, 25.6°, and 28.4° in X-ray diffraction with CuKα radiation, the chlorogallium phthalocyanine crystals being represented by the formula (2) in which $X^1$ in the formula (2) represents a chlorine atom, were used in place of the hydroxygallium phthalocyanine crystals having peaks at Bragg angles 2θ of 6.9° and 26.6° in X-ray diffraction with CuKα radiation, the hydroxygallium phthalocyanine crystals being represented by the formula (2) in which $X^1$ in the formula (2) represents a hydroxy group. The resulting solution of the gallium phthalocyanine was filtered under reduced pressure in the same way as in Example 1. After the filtration, it was confirmed that the insoluble residue of the gallium phthalocyanine (chlorogallium phthalocyanine) was not present on the filter paper.

Example 8

A solution of a gallium phthalocyanine (hydroxygallium phthalocyanine) was prepared as in Example 1, except that 50 parts of 1,2-diaminoethane was used as a compound represented by the formula (1) in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 9

A solution of a gallium phthalocyanine (chlorogallium phthalocyanine) was prepared as in Example 7, except that 50 parts of 1,2-diaminoethane was used as a compound represented by the formula (1) in place of 50 parts of 1,3-diaminopropane. The resulting solution of the gallium phthalocyanine was filtered under reduced pressure in the same way as in Example 7. After the filtration, it was confirmed that the insoluble residue of the gallium phthalocyanine (chlorogallium phthalocyanine) was not present on the filter paper.

Example 10

A solution of a gallium phthalocyanine (hydroxygallium phthalocyanine) was prepared as in Example 1, except that the amount of the gallium phthalocyanine (hydroxygallium phthalocyanine) dissolved in 50 parts of 1,3-diaminopropane was set to 1 part instead of 3 parts. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 11

A solution of a gallium phthalocyanine (hydroxygallium phthalocyanine) was prepared as in Example 1, except that the amount of the gallium phthalocyanine (hydroxygallium phthalocyanine) dissolved in 50 parts of 1,3-diaminopropane was set to 9 parts instead of 3 parts. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 12

A solution of a gallium phthalocyanine (hydroxygallium phthalocyanine) was prepared as in Example 1, except that 50 parts of 1,6-diaminohexane was used as a compound represented by the formula (1) in place of 50 parts of 1,3-diaminopropane and that the mixture temperature during the stirring with the magnetic stirrer was set at 50° C. instead of 23° C. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 13

A solution of a gallium phthalocyanine (hydroxygallium phthalocyanine) was prepared as in Example 12, except that 50 parts of 1,7-diaminoheptane was used as a compound represented by the formula (1) in place of 50 parts of 1,6-diaminohexane. The resulting solution of the gallium phthalocyanine was filtered under reduced pressure in the same way as in Example 12. After the filtration, it was confirmed that the insoluble residue of the gallium phthalocyanine (hydroxygallium phthalocyanine) was not present on the filter paper.

Example 14

A solution of a gallium phthalocyanine (hydroxygallium phthalocyanine) was prepared as in Example 12, except that 50 parts of 1,9-diaminononane was used as a compound represented by the formula (1) in place of 50 parts of 1,6-diaminohexane. The resulting solution of the gallium phthalocyanine was filtered under reduced pressure in the same way as in Example 12. After the filtration, it was confirmed that the insoluble residue of the gallium phthalocyanine (hydroxygallium phthalocyanine) was not present on the filter paper.

Example 15

A solution of a gallium phthalocyanine (hydroxygallium phthalocyanine) was prepared as in Example 1, except that 50 parts of 1,12-diaminododecane was used as a compound represented by the formula (1) in place of 50 parts of 1,3-diaminopropane and that the mixture temperature during the stirring with the magnetic stirrer was set at 80° C. instead of 23° C. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was not present on the filter paper.

Example 16

A solution of a gallium phthalocyanine (hydroxygallium phthalocyanine) was prepared as in Example 15, except that 50 parts of 1,11-diamino-3,6,9-trioxaundecane was used as a compound represented by the formula (1) in place of 50 parts of 1,12-diaminododecane. The resulting solution of the gallium phthalocyanine was filtered under reduced pressure in the same way as in Example 15. After the filtration, it was confirmed that the insoluble residue of the gallium phthalocyanine (hydroxygallium phthalocyanine) was not present on the filter paper.

Example 17

A solution of a gallium phthalocyanine (hydroxygallium phthalocyanine) was prepared as in Example 8, except that the amount of the gallium phthalocyanine (hydroxygallium phthalocyanine) dissolved in 50 parts of 1,2-diaminoethane was set to 10 parts instead of 3 parts. The resulting solution of the gallium phthalocyanine was filtered under reduced pressure in the same way as in Example 8. After the filtration, it was confirmed that the insoluble residue of the gallium phthalocyanine (hydroxygallium phthalocyanine) was present on the filter paper. The amount of the insoluble residue of the gallium phthalocyanine (hydroxygallium phthalocyanine) was measured as described below and found that 1 part of gallium phthalocyanine (hydroxygallium phthalocyanine) remained undissolved.

Method for Measuring Amount of Insoluble Residue

The filter paper on which the insoluble residue was placed after the filtration was dried in a vacuum dryer under reduced pressure at 150° C. for 12 hours. The dry mass was measured. The difference in mass between the dry mass and the mass of the filter paper before the filtration was defined as the amount of the insoluble residue.

Comparative Example 1

A solution of a gallium phthalocyanine (hydroxygallium phthalocyanine) was prepared as in Example 10, except that 50 parts of N,N'-dimethylethylenediamine was used in place of 50 parts of 1,3-diaminopropane. The resulting solution of the gallium phthalocyanine was filtered under reduced pressure in the same way as in Example 1. After the filtration, it was confirmed that the insoluble residue of the gallium phthalocyanine (hydroxygallium phthalocyanine) was present on the filter paper. The amount of the insoluble residue of the gallium phthalocyanine (hydroxygallium phthalocyanine) was measured as in Example 17 and found that 0.9 parts of gallium phthalocyanine (hydroxygallium phthalocyanine) remained undissolved.

Comparative Example 2

An attempt was made to prepare a solution of a gallium phthalocyanine (hydroxygallium phthalocyanine) as in Example 10, except that 50 parts of N,N-dimethylformamide was used in place of 50 parts of 1,3-diaminopropane. The resulting liquid containing the gallium phthalocyanine was filtered under reduced pressure in the same way as in Example 1. After the filtration, it was confirmed that the insoluble residue of the gallium phthalocyanine (hydroxygallium phthalocyanine) was present on the filter paper. The amount of the insoluble residue of the gallium phthalocyanine (hydroxygallium phthalocyanine) was measured as in Example 17 and found that 0.2 parts of gallium phthalocyanine (hydroxygallium phthalocyanine) remained undissolved.

Comparative Example 3

An attempt was made to prepare a solution of a gallium phthalocyanine (hydroxygallium phthalocyanine) as in Example 10, except that 50 parts of dimethyl sulfoxide was used in place of 50 parts of 1,3-diaminopropane. The resulting liquid containing the gallium phthalocyanine was filtered under reduced pressure in the same way as in Example 1. After the filtration, it was confirmed that the insoluble residue of the gallium phthalocyanine (hydroxygallium phthalocyanine) was present on the filter paper. The amount of the insoluble residue of the gallium phthalocyanine (hydroxygallium phthalocyanine) was measured as in Example 17 and found that 0.7 parts of gallium phthalocyanine (hydroxygallium phthalocyanine) remained undissolved.

Comparative Example 4

A solution of a gallium phthalocyanine (hydroxygallium phthalocyanine) was prepared as in Example 17, except that 50 parts of dimethyl sulfoxide was used in place of 50 parts of 1,2-diaminoethane. The resulting solution of the gallium phthalocyanine was filtered under reduced pressure in the same way as in Example 17. The amount of the insoluble residue of the gallium phthalocyanine (hydroxygallium phthalocyanine) was measured as in Example 17 and found that 9.7 parts of gallium phthalocyanine (hydroxygallium phthalocyanine) remained undissolved.

Example 18

Three parts of a composition containing 98.5% by mass chlorogallium phthalocyanine was dissolved in 50 parts of 1,3-diaminopropane serving as a compound represented by the formula (1) under stirring to prepare a solution of a composition containing a gallium phthalocyanine (chlorogallium phthalocyanine). The solution was subjected to column chromatography treatment. An $NH_2$-modified silica gel (trade name: $NH_2$-type Chromatorex, manufactured by Fuji Silysia Chemical Ltd.) was used as an adsorption medium. Next, the solution was filtered under reduced pressure with a membrane filter (trade name: Poreflon membrane filter FP-022, manufactured by Sumitomo Electric Fine Polymer, Inc). The resulting solution was mixed with water to precipitate the chlorogallium phthalocyanine. The mixture was filtered under reduced pressure to give a purified composition containing the chlorogallium phthalocyanine. The purified composition containing the chlorogallium phthalocyanine was subjected to simultaneous thermogravimetry and differential thermal analysis (TG-DTA) at a rate of temperature increase of 10° C./min. The difference in mass between 40° C. and 440° C. was defined as impurities other than the chlorogallium phthalocyanine. The measurement results demonstrated that the proportion of the impurities in the composition was 0.3% by mass. In other words, the proportion of the chlorogallium phthalocyanine in the composition was 99.7% by mass. The same applies hereinafter.

Example 19

A purified composition containing a chlorogallium phthalocyanine was prepared as in Example 18, except that 50 parts of 1,3-diaminoethane was used as a compound represented by the formula (1) in place of 50 parts of 1,3-diaminopropane. The purified composition containing the chlorogallium phthalocyanine was subjected to simultaneous thermogravimetry and differential thermal analysis (TG-DTA) in the same way as in Example 18. The measurement results demonstrated that the proportion of the impurities in the composition was 0.4% by mass.

Example 20

A purified composition containing a chlorogallium phthalocyanine was prepared as in Example 18, except that the column chromatography was not performed. The purified composition containing the chlorogallium phthalocyanine was subjected to simultaneous thermogravimetry and differential thermal analysis (TG-DTA) in the same way as in Example 18. The measurement results demonstrated that the proportion of the impurities in the composition was 0.6% by mass.

Example 21

A purified composition containing a chlorogallium phthalocyanine was prepared as in Example 20, except that 50 parts of 1,3-diaminoethane was used as a compound represented by the formula (1) in place of 50 parts of 1,3-diaminopropane. The purified composition containing the chlorogallium phthalocyanine was subjected to simultaneous thermogravimetry and differential thermal analysis (TG-DTA) in the same way as in Example 20. The measurement results demonstrated that the proportion of the impurities in the composition was 0.8% by mass.

Comparative Example 5

An attempt was made to prepare a purified composition containing a chlorogallium phthalocyanine as in Example 20, except that 50 parts of concentrated sulfuric acid was used in place of 50 parts of 1,3-diaminopropane. Although an attempt was made to filter the composition containing the chlorogallium phthalocyanine was filtered under reduced pressure in the same way as in Example 20, it was difficult to perform the filtration due to poor filterability, thereby failing to provide a purified composition containing a chlorogallium phthalocyanine.

Example 22

Three parts of gallium phthalocyanine (hydroxygallium phthalocyanine) crystals (solute) having peaks at Bragg angles 2θ of 6.9° and 26.6° in X-ray diffraction with CuKα radiation were dissolved in 50 parts of 1,3-diaminoethane (solvent) under stirring to prepare a solution of a hydroxygallium phthalocyanine. The solution was added dropwise to 500 parts of N,N-dimethylformamide serving as a solvent for precipitation to precipitate a hydroxygallium phthalocyanine. The resulting mixture was filtered under reduced pressure to give hydroxygallium phthalocyanine crystals. The hydroxygallium phthalocyanine crystals had peaks at Bragg angles 2θ of 7.4° and 28.3° in X-ray diffraction with CuKα radiation. FIGURE illustrates the measurement result of the crystal form (X-ray diffraction pattern).

Examples 23 to 38

Hydroxygallium phthalocyanine crystals were prepared as in Example 22, except that solutes, solvents for gallium phthalocyanines, and solvents for precipitation as described in Tables 1 and 2 were used. Tables 1 and 2 also illustrate crystal forms of the hydroxygallium phthalocyanine crystals (peak positions in X-ray diffraction with CuKα radiation (Bragg angle 2θ).

TABLE 1

| Example | Solute | Bragg angle 2θ | Solvent for gallium phthalocyanine | Solvent for precipitation | Crystal prepared | Bragg angle 2θ |
|---|---|---|---|---|---|---|
| 22 | hydroxygallium phthalocyanine crystal | 6.9° and 26.6° | 1,2-diaminoethane | N,N-dimethylformamide | hydroxygallium phthalocyanine crystal | 7.4° and 28.3° |
| 23 | hydroxygallium phthalocyanine crystal | 6.9° and 26.6° | 1,3-diaminopropane | N,N-dimethylformamide | hydroxygallium phthalocyanine crystal | 7.4° and 28.3° |

TABLE 1-continued

| Example | Solute | Bragg angle 2θ | Solvent for gallium phthalocyanine | Solvent for precipitation | Crystal prepared | Bragg angle 2θ |
|---|---|---|---|---|---|---|
| 24 | chlorogallium phthalocyanine crystal | 7.4°, 25.6°, and 28.4° | 1,3-diaminopropane | N,N-dimethylformamide | hydroxygallium phthalocyanine crystal | 7.4° and 28.3° |
| 25 | hydroxygallium phthalocyanine crystal | 6.9° and 26.6° | 1,3-diaminopropane | tetrahydrofuran | hydroxygallium phthalocyanine crystal | 7.4° and 28.3° |
| 26 | hydroxygallium phthalocyanine crystal | 6.9° and 26.6° | 1,3-diaminopropane | acetone | hydroxygallium phthalocyanine crystal | 7.4° and 28.3° |
| 27 | hydroxygallium phthalocyanine crystal | 6.9° and 26.6° | 1,3-diaminopropane | 1,3-dioxolan | hydroxygallium phthalocyanine crystal | 7.4° and 28.3° |
| 28 | hydroxygallium phthalocyanine crystal | 6.9° and 26.6° | 1,3-diaminopropane | pyridine | hydroxygallium phthalocyanine crystal | 7.4° and 28.3° |
| 29 | hydroxygallium phthalocyanine crystal | 6.9° and 26.6° | 1,3-diaminopropane | N-methyl-2-pyrrolidone | hydroxygallium phthalocyanine crystal | 7.4° and 28.3° |
| 30 | hydroxygallium phthalocyanine crystal | 6.9° and 26.6° | 1,3-diaminopropane | acetonitrile | hydroxygallium phthalocyanine crystal | 7.4° and 28.3° |
| 31 | hydroxygallium phthalocyanine crystal | 6.9° and 26.6° | 1,3-diaminopropane | dimethyl sulfoxide | hydroxygallium phthalocyanine crystal | 7.4° and 28.3° |

TABLE 2

| Example | Solute | Bragg angle 2θ | Solvent for gallium phthalocyanine | Solvent for precipitation | Crystal prepared | Bragg angle 2θ |
|---|---|---|---|---|---|---|
| 32 | hydroxygallium phthalocyanine crystal | 6.9° and 26.6° | 1,3-diaminopropane | γ-butyrolactone | hydroxygallium phthalocyanine crystal | 7.4° and 28.3° |
| 33 | hydroxygallium phthalocyanine crystal | 7.4° and 28.3° | 1,2-diaminoethane | water | hydroxygallium phthalocyanine crystal | 6.9° and 26.6° |
| 34 | hydroxygallium phthalocyanine crystal | 7.4° and 28.3° | 1,3-diaminopropane | water | hydroxygallium phthalocyanine crystal | 6.9° and 26.6° |
| 35 | chlorogallium phthalocyanine crystal | 7.4°, 25.6°, and 28.4° | 1,3-diaminopropane | water | hydroxygallium phthalocyanine crystal | 6.9° and 26.6° |
| 36 | hydroxygallium phthalocyanine crystal | 7.4° and 28.3° | 1,3-diaminopropane | toluene | hydroxygallium phthalocyanine crystal | 6.9° and 26.6° |
| 37 | hydroxygallium phthalocyanine crystal | 7.4° and 28.3° | 1,3-diaminopropane | triethylamine | hydroxygallium phthalocyanine crystal | 6.9° and 26.6° |
| 38 | hydroxygallium phthalocyanine crystal | 7.4° and 28.3° | 1,3-diaminopropane | propylene carbonate | hydroxygallium phthalocyanine crystal | 6.9° and 26.6° |

Example 39

Production of Electrophotographic Photosensitive Member

An aluminum cylinder (JIS-A3003, aluminum alloy) having a diameter of 24 mm and a length of 257.5 mm was used as a support (cylindrical support).

Next, 60 parts of barium sulfate particles coated with tin oxide (trade name: Pastran PC1, manufactured by Mitsui Mining and Smelting Co., Ltd.), 15 parts of titanium oxide particles (trade name: TITANIX JR, manufactured by Tayca Corp.), 43 parts of a resol-type phenolic resin(trade name: Phenolite J-325, manufactured by Dainippon Ink and Chemicals, Inc., solid content: 70% by mass), 0.015 parts of a silicone oil (trade name: SH28PA, manufactured by Toray Silicone Industries Inc.), 3.6 parts of silicone resin particles (trade name: Tospearl 120, manufactured by Toshiba Silicone Co., Ltd), 50 parts of 2-methoxy-1-propanol, and 50 parts of methanol were charged into a ball mill. The mixture was subjected to dispersion treatment for 20 hours to prepare a conductive layer coating liquid. The conductive layer coating liquid was applied onto the support by dipping. The resulting coating film was cured by heating for 1 hour at 140° C. to form a conductive layer having a thickness of 15 μm.

Then 10 parts of a nylon copolymer (trade name: Amilan CM8000, manufactured by Toray Industries, Inc.) and 30 parts of a methoxymethylated 6-nylon resin (trade name: Toresin EF-30T, manufactured by Teikoku Chemical Industry Co., Ltd.) were dissolved in a solvent mixture of 400 parts of methanol and 200 parts of n-butanol to prepare an undercoat layer coating liquid. The undercoat layer coating liquid was applied onto the conductive layer by dipping. The resulting coating film was dried for 6 minutes at 80° C. to form an undercoat layer having a thickness of 0.45 μm.

Next, 10 parts of the hydroxygallium phthalocyanine crystals (charge generation material) prepared in Example 24, 5 parts of polyvinyl butyral (trade name: S-LEC BX-1, manufactured by Sekisui Chemical Co., Ltd.), and 250 parts of cyclohexanone were charged into a sand mill together with glass beads 1 mm in diameter. The mixture was subjected to dispersion treatment for 6 hours to give a dispersion. To the resulting dispersion, 250 parts of ethyl acetate was added. Thereby, a charge generation layer coating liquid was prepared. The charge generation layer coating liquid was applied onto the undercoat layer by dipping. The resulting coating film was dried for 10 minutes at 100° C. to form a charge generation layer having a thickness of 0.16 μm.

Next, 80 parts of a compound represented by the formula (3) (charge transport material (hole transport compound)):

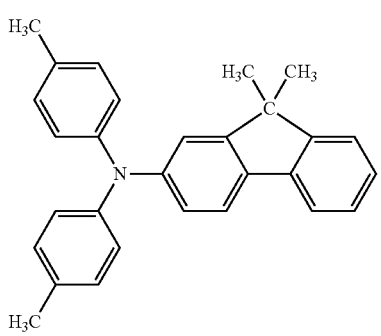

(3)

and 100 parts of a bisphenol Z-type polycarbonate (trade name: Iupilon 2200, manufactured by Mitsubishi Engineering Plastics Corp.) were dissolved in a solvent mixture of 600 parts of monochlorobenzene and 200 parts of dimethoxymethane to prepare a charge transport layer coating liquid. The charge transport layer coating liquid was applied onto the charge generation layer by dipping. The resulting coating film was dried for 30 minutes at 120° C. to form a charge transport layer having a thickness of 15 μm.

Thereby, a cylindrical (drum-shaped) electrophotographic photosensitive member was produced. Evaluation of electrophotographic photosensitive member Electrophotographic properties of the resulting electrophotographic photosensitive member were measured with a direct voltage impression-type measurement apparatus including a curved NESA glass. With respect to a measurement sequence, the electrophotographic photosensitive member was regarded as a capacitor, so the sequence of a capacitor model was used.

To eliminate the hysteresis of the electrophotographic photosensitive member (potential hysteresis), the entire surface of the electrophotographic photosensitive member was irradiated with light having a predetermined light quantity (1 μJ/cm²). Ten milliseconds thereafter, the surface of the electrophotographic photosensitive member was charged in a dark place in such a manner that the surface of the electrophotographic photosensitive member had a potential of −700 V. Then the electrophotographic photosensitive member was subjected to light exposure. The amount of light exposure required to achieve a surface potential of the electrophotographic photosensitive member of −200 V, i.e., $E\Delta_{500\,V}$, was measured and found to be 0.25 μJ/cm².

Reference Example 1

An electrophotographic photosensitive member was produced as in Example 39, except that hydroxygallium phthalocyanine crystals prepared by the following method were used in place of the hydroxygallium phthalocyanine crystals prepared in Example 24.

Chlorogallium phthalocyanine crystals were dissolved in concentrated sulfuric acid to perform acid pasting treatment. Then neutralization washing was performed with 2% aqueous ammonia (neutralization step). Washing was performed twice with water, followed by drying. Note that filtration was performed for each washing. Next, milling treatment was performed with N,N-dimethylformamide, thereby providing hydroxygallium phthalocyanine crystals having peaks at Bragg angles 2θ of 7.4° and 28.3° in X-ray diffraction with CuKα radiation.

The same evaluation as in Example 39 was made and found that $E\Delta_{500\,V}$ was 0.24 μJ/cm².

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-017120 filed Jan. 31, 2013 and No. 2013-159301 filed Jul. 31, 2013, which are hereby incorporated by reference herein in their entirety.

What is claimed is:

1. A method for preparing a solution of a gallium phthalocyanine, comprising:

dissolving a gallium phthalocyanine represented by the formula (2) in a compound represented by the formula (1),

(1)

wherein, in the formula (1), $R^1$ represents a single bond, or a substituted or unsubstituted alkylene group having 1 to 10 main-chain carbon atoms, a substituent of the substituted alkylene group is an alkyl group having 1 to 3 carbon atoms, an alkyl group having 1 to 3 carbon atoms and being substituted with an amino group, or a hydroxy group, one of the carbon atoms in the main chain of the alkylene group may be replaced with an oxygen atom, a sulfur atom, or a bivalent group represented by the formula —$NR^2$—, and $R^2$ represents a hydrogen atom, an alkyl group having 1 to 3 carbon atoms, or an alkyl group having 1 to 3 carbon atoms and being substituted with an amino group, and

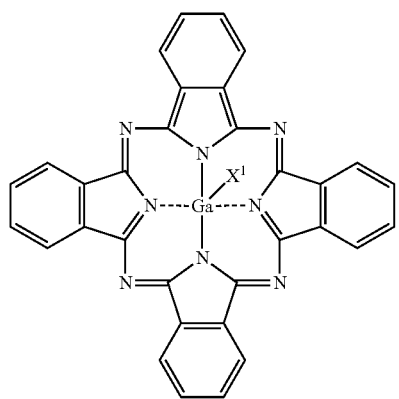

(2)

wherein, in the formula (2), $X^1$ represents a chlorine atom or a hydroxy group.

2. The method for preparing a solution of a gallium phthalocyanine according to claim 1, wherein the gallium phthalocyanine represented by the formula (2) is dissolved in an amount of 18 parts by mass or less with respect to 100 parts by mass of the compound represented by the formula (1).

3. The method for preparing a solution of a gallium phthalocyanine according to claim 1, wherein the compound represented by the formula (1) is a compound represented by the formula (1a), $$H_2N-CH_2-R^3-CH_2-NH_2 \qquad (1a)$$

wherein, in the formula (1a), $R^3$ represents a substituted or unsubstituted alkylene group having 1 to 3 main-chain carbon atoms, a substituent of the substituted alkylene group is an alkyl group having 1 or 2 carbon atoms or an alkyl group having 1 or 2 carbon atoms and being substituted with an amino group, one of the carbon atoms in the main chain of the alkylene group may be replaced with an oxygen atom, a sulfur atom, or a bivalent group represented by the formula $-NR^4-$, and $R^4$ represents an alkyl group having 1 or 2 carbon atoms, or an alkyl group having 1 or 2 carbon atoms and being substituted with an amino group.

4. A method for producing an electrophotographic photosensitive member, comprising:

preparing a solution of a gallium phthalocyanine by the method according to claim 1; and producing an electrophotographic photosensitive member by the use of the prepared solution of the gallium phthalocyanine.

* * * * *